Jan. 6, 1925.
1,521,985
W. B. BASTIAN
AUTOMATIC VALVE FOR WATER HEATERS
Filed Nov. 5, 1921
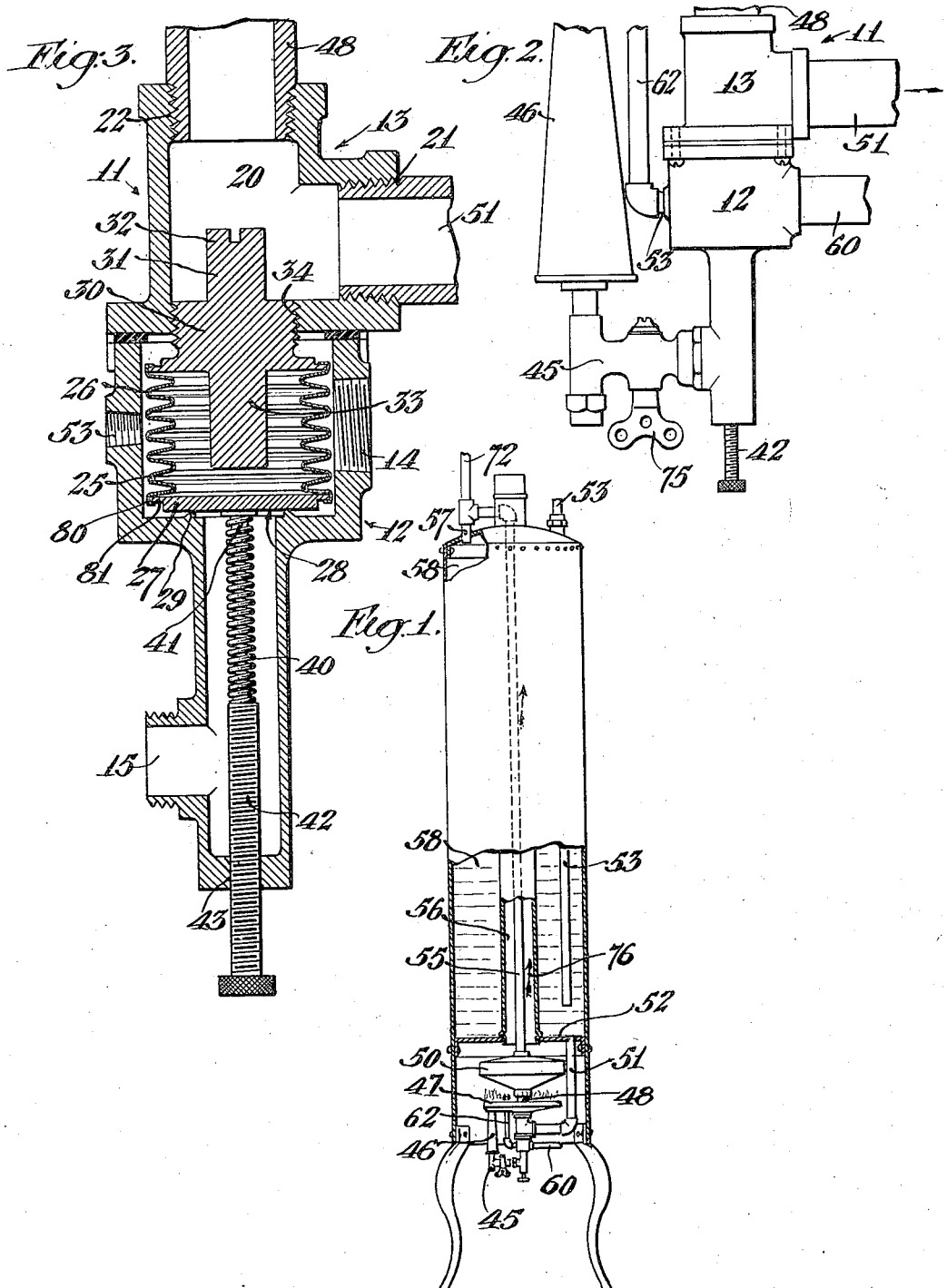
Inventor
William B. Bastian
by Graham + Hunt
Attorneys.

Patented Jan. 6, 1925.

1,521,985

UNITED STATES PATENT OFFICE.

WILLIAM B. BASTIAN, OF LOS ANGELES, CALIFORNIA.

AUTOMATIC VALVE FOR WATER HEATERS.

Application filed November 5, 1921. Serial No. 513,113.

*To all whom it may concern:*

Be it known that I, WILLIAM B. BASTIAN, a citizen of the United States, residing at Los Angeles, in the county of Los Angeles and State of California, have invented a new and useful Automatic Valve for Water Heaters, of which the following is a specification.

This invention relates to thermostatic devices for regulating the delivery of fuel gas to the burners of water heaters, and relates particularly to a gas controlling valve having a thermostat situated therein, actuated to regulate the flow of gas to the burner by the heat of a flow of water from the boiler of a water heater having thermostatic contact with the thermostat.

It is an object of my invention to provide a thermostatically operated valve which can be quickly adjusted to shut off at any desired temperature.

It is a further object of my invention to provide a thermostatically operated valve which will be positive in operation and comprised of a minimum number of parts.

It is a further object of my invention to provide in such a valve a thermostat element which is sensitive in its operation and yet durable in its construction, and adapted to be contained in a small valve body.

It is also an object of my invention to provide in such a device a valve closure plate of unitary construction with the thermostat element.

Other objects and advantages will be made evident hereinafter.

Referring to the drawing which is for illustrative purposes only:

Fig. 1 is an elevational view of a water heater having an automatic valve of my invention associated therewith to control the flow of gas to the burners.

Fig. 2 is an enlarged view of the valve, shown in Fig. 1.

Fig. 3 is a vertical cross section through the valve to illustrate the interior construction thereof.

As shown in the Figures 2 and 3 of the drawing, 11 indicates a valve body comprised of a lower section 12 and an upper section 13, the lower section being provided with a gas inlet 14 and a gas outlet 15, and the upper section forming a fitting in a water circulating passage 20 into which are connected, by suitable threaded joints 21 and 22, water circulating pipes 51 and 48 respectively. A thermostic element 25, having a body of volatile substance, such as ether, enclosed therein, is situated within the lower section 12 of the valve body 11. Said element comprises a corrugated tubular member 26, the lower end of which is closed by a head 27 providing a substantially flat face 28 adapted to form a closure with a valve seat 29 provided in the construction of the member 12, as shown in Fig. 3, the upper end of said tubular member being closed by a head 30, having an axially extending core 31 projecting into the water passage 20, as shown at 32, and projecting within the corrugated member 26, as shown at 33. The thermostatic element is secured in place by threaded engagement 34, with the member 13; and a regulating means consisting of a resilient element, such as the spring 40, is so placed as to exert pressure against the face 28, of the head 27 which has a projection 41 thereon over which fits the upper end of said spring, the intensity of the force which the spring 40 exerts against the plate 27, being adjusted by a screw 42 threaded through the end 43 of the member 12.

In the installation of this valve, as shown in Fig. 1, I attach, to the gas outlet 15, a valve fixture 45 that leads into the mixing column 46, of a burner 47, situated above the valve and surrounding the pipe 48, which connects the threaded joint 22, and a heating element 50. Water circulating piping 51 leads from the bottom 52 of the heater, and connects into the joint 21 of the valve member 13 permitting a circulation through the passage 20 of the valve, of water which has been previously entered into the tank through supply piping 53, the circuit being completed through piping 55, which extends within the heater 56, and connects between the heating element 50 and the top of the storage chamber 58, as indicated at 57. In the initial operation of the water heater, the storage chamber 58 is first filled with cold water through piping 53, then, being assured that the valve 75 of the fixture 45 is closed, a valve, not shown, in the gas service pipe 60 may be opened, allowing gas to enter the member 12 of the valve, and the pilot 62 lighted, whereupon, the valve 75 may be opened and the gas allowed to flow into the burner, to be lighted by the pilot 62.

It will be noted that the element 50 is placed in such a position that the flames from the burner play directly thereagainst, so that the water therein will become heated, and will circulate upward through the piping 55, as indicated by the arrows 76, entering into the top of the storage chamber 38, at 57. As the hot water circulates upwards through the element 50, it is replaced by water which circulates downwardly through the piping 51, and the passage 20, thereafter rising into the element 50, to be heated. When all of the water in the chamber 58 has become heated, hot water starts to circulate through the piping 56, while water entering the passage 20 heats the extension 32, of the core 31, which is preferably of a material, such as copper, having very high heat conductive qualities. The heat is convected through the head 30, into the lower portion 33 of the core 31 and is given off into the body of ether contained in the thermostat element 25, whereupon, the ether is vaporized and an internal pressure is created within the element causing a downward movement of the head 27, against the action of the spring 40, causing the face 28, of the head 27, to seat against the valve seat 29, thus shutting off the supply of gas to the burner. By adjusting the compression of the spring 40, through the screwing upwardly or downwardly of the screw 42, it is possible to vary the resistance upon the plate 27 against the action of the vaporized ether to form a closure between the face 28 and the seat 29, making it necessary to bring the flow of water through the passage 20 to a higher temperature, to provide an increased pressure within the thermostat element 25.

When hot water is drawn from the storage chamber 50 through piping 72, an inward flow of cold water from the piping 53 must take place to replace the water drawn from the chamber 58, the cold water flowing into the chamber to replace the hot water drawn therefrom. The hot water, taken from the heater, is drawn partly from the storage chamber and partly from the piping 55, which causes cold water, entering through piping 53, to be circulated downward through the piping 51 and the passage 20, and the thermostat element is cooled by contact of the cold water with the core 31, whereupon, the ether contained within the element 25 in volatilized condition is condensed and the pressure within the element 25 is reduced, causing the head 27 to recede, due to the action of the spring 40, and causing the head 27 to be removed from the valve seat 29, allowing gas to again be supplied to the burner 47. The burner continues to operate until the water within the compartment 58 has again become entirely heated so that the hot water again circulates through the piping 51 and the passage 20 of the valve, causing the thermostat element to actuate under the influence of the heat delivered thereto, from the flow of hot water.

The manner in which the thermostat element 25 is constructed, provides a very sensitive and yet durable device, as the number of working parts is reduced to a minimum. The corrugated tubular member 26 is joined to the heads 27 and 30 by rolling the edges 80 thereof over flanges 81, provided upon the heads 27 and 30 and running a small amount of solder around the joints formed thereby. It will be perceived that with this construction the necessity of a separate valve closure means is eliminated, as the head 27 is adapted to perform that function. The very simple means I employ to adjust the temperature at which the valve closes also contributes to the economical construction of the valve.

I claim as my invention:

1. In a water heater, the combination of: a valve body; a valve in said body; a hollow expansible member in said body connected at one end to the valve closure member; a heat conducting plug screw seated in a wall of said body, to which plug the other end of said expansible member is connected; and a solid core formed on said plug projecting into said expansible member and into the water circulating passage of the water heater.

2. In a water heater, the combination of: a water conducting shell having an inlet and an outlet and an intermediate opening; a valve body arranged to fit over said intermediate opening, said valve body having a valve opening opposite to said intermediate opening; a valve closure member arranged to cooperate with said valve opening; a hollow expansible member in said valve body, connected at one end to the valve closure member; a heat conducting plug seated in said intermediate opening and extending into said shell, to which plug the other end of said expansible member is connected; and a solid core formed on said plug projecting into said expansible member and into said water conducting shell, there being engagement means at the end of said core projecting into said shell for rotating said plug.

In testimony whereof, I have hereunto set my hand at Los Angeles, California, this 24th day of October, 1921.

WILLIAM B. BASTIAN.